UNITED STATES PATENT OFFICE.

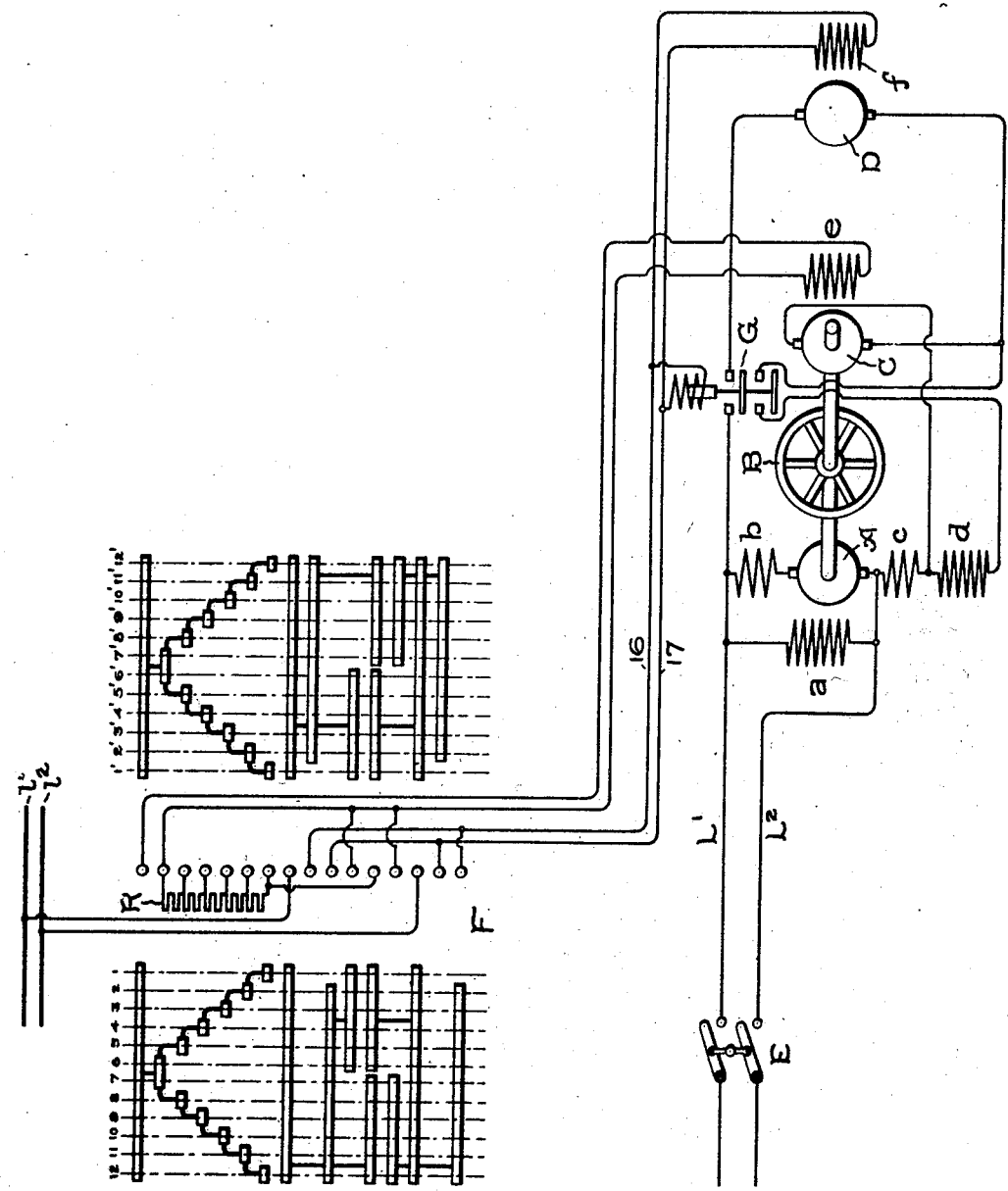

JOHN A. SEEDE, OF SCHENECTADY, NEW YORK, ASSIGNOR TO GENERAL ELECTRIC COMPANY, A CORPORATION OF NEW YORK.

MOTOR-CONTROL SYSTEM.

No. 927,178.  Specification of Letters Patent.  Patented July 6, 1909.

Application filed May 28, 1908. Serial No. 435,502.

*To all whom it may concern:*

Be it known that I, JOHN A. SEEDE, a citizen of the United States, residing at Schenectady, county of Schenectady, State of New York, have invented certain new and useful Improvements in Motor-Control Systems, of which the following is a specification.

My invention relates to motor control systems and more particularly to such systems in which the motors are subjected to momentary overloads and must be often reversed.

The power required to drive rolling mills, hoists and like apparatus, varies between wide limits, and it is one of the objects of my invention to limit the amount of power demanded from the source upon the occurrence of a momentary overload. To this end, I excite an auxiliary field winding of the motor of a fly-wheel motor generator set so that the motor of the set will tend to reduce its speed and allow the fly-wheel to give up some of its energy when the voltage supplied the load motor is increased.

My invention also consists in means operating on the motor field of a fly-wheel motor generator set to limit the amount of power demanded from a source of direct current supplying the motor of said set, said source and generator in series supplying the motor which drives the rolling mill or hoist.

In another aspect, my invention consists in a system of motor control comprising a source of direct current supplying the motor of a fly-wheel motor generator set, an auxiliary field winding on said motor excited by the generator of said set, and a second motor supplied with current from said source and generator in series.

In still another aspect, my invention consists in a system of motor control comprising a source of direct current supplying the motor of a fly-wheel motor generator set, an auxiliary field winding on said motor connected across the terminals of the generator of said set, a second motor supplied by said source and generator in series, and means for varying the potential of said generator so as to oppose the potential of said source when said second motor is starting and to assist the potential of said source when said second motor is running at high speed, the auxiliary field winding opposing the main field winding of said first mentioned motor when the said second motor is starting and helping the main field winding when the second motor is operating at high speed.

Others features of novelty which characterize my invention are pointed out with particularity in the claims annexed to and forming a part of this specification.

For a better understanding of my invention, however, reference may be had to the following description taken in connection with the accompanying drawing in which the single figure shows diagrammatically a control system arranged according to my invention.

Referring to the drawing, the fly-wheel motor generator set comprises the motor A, fly-wheel B, and generator C.

D is the motor for driving the rolling mill or hoist. The lines $L^1$ and $L^2$ are connected to a source of direct current by means of the switch E.

I have shown the motor A as having a shunt field winding $a$, a series field winding $b$ in series with the motor armature, a series field winding $c$, and an auxiliary field winding $d$. The auxiliary field winding $d$ is connected across the terminals of generator C. The generator C has a separately-excited field winding $e$, excited from the lines $l'$ and $l^2$, through the control switch F and in parallel with the resistance sections R. The field winding $f$ of the motor D is also separately excited from the lines $l'$ and $l^2$, through the control switch F. The lines $l'$ and $l^2$ may be connected to the same source as that to which the lines $L^1$ and $L^2$ are connected. The switch G closes and opens the armature circuit of the motor D and also the auxiliary field winding circuit of the motor A. The provision of the series field winding $b$ on the motor A is for the purpose of taking care of the fluctuations of the line voltage. The armature of the generator C is in series with the armature of motor D and series field winding $c$ of motor A.

In considering the operation of my control system, it will be assumed that the switch E has been closed and the motor A has been started in the usual manner and is driving the generator C at normal speed. The control switch F is shown in its "off" position. By moving the drum and fingers with reference to one another to position 1, the field $e$ of generator C is connected across the lines $l'$ and $l^2$ in shunt with the resistance sections R, and the generator builds up with its voltage in opposition to that of the source. Upon moving the switch to position 2, the lines 16 and 17 are connected to the lines $l'$ and $l^2$, thereby exciting the field $f$ of motor D, and supplying current to the actuating coil of switch G. Switch G will, therefore, close and complete the armature circuit of motor D and the auxiliary field circuit of motor A. The resistance R is still connected across the line, but the field winding $e$ is now shunted across only a portion of this resistance and, consequently, is not supplied with as much voltage as before, the voltage of generator C is reduced and current is supplied to the motor D at a low voltage by the well-known counter-electromotive force method. The auxiliary field winding $d$ in this position of the switch opposes the other field windings on the motor A, and counteracts the action of field winding $c$.

The movement of the control switch through positions 3 to 6 inclusive reduces the amount of resistance across which the generator field $e$ is shunted, and reduces the excitation of the generator C, and, therefore, its voltage until in position 6 this field winding is short-circuited and the generator voltage is reduced practically to zero. This reduction of the voltage of generator C increases the voltage supplied motor D and it speeds up. As the voltage of C decreases the strength of the field produced by winding $d$ decreases, and consequently the resultant field of motor A is increased.

If a heavy load is thrown on motor D, when the voltage of generator C opposes that of the source, the control switch F is moved so as to weaken the field of generator C in order to increase the voltage impressed across the terminals of motor D, the voltage impressed across the winding $d$ being simultaneously decreased. This increases the field of motor A, it tends to slow down, runs as a generator, being driven by the fly-wheel, and returns energy to the system. When control switch F is moved to position 7, the same conditions obtain as in position 6, except that the connections of the field winding $e$ have been reversed with respect to the short-circuit. A further movement of the switch through positions 8 to 12 inclusive increases the resistance across which the field winding $e$ is shunted and thereby increases the voltage applied to the winding $e$. The generator voltage is now in a direction additive to that of the source, the generator assists the source in supplying power to the motor D, as will be hereafter explained, and the motor D runs at a high speed. The current in the auxiliary field winding $d$ reverses with the reversal of the voltage of generator C, since it is connected across the terminals of the generator, and now assists the other field windings of motor A.

In case a momentary overload is thrown on motor D when the voltage of generator C is additive to that of the source, the control switch is moved into positions 8 to 12 inclusive in such a direction as to increase the voltage of the generator C. The additional energy required to drive motor D, when overloaded, will be supplied by this increase in voltage without materially increasing the current taken from the lines $L^1$ and $L^2$, because as the voltage of the generator increases the excitation of the auxiliary field winding $c$ increases thereby tending to slow down the motor generator set and allowing the fly-wheel to give up some of its stored energy. The presence of series field winding $c$ is also useful in helping to tend to reduce the speed of motor A upon the occurrence of an overload. If the control switch had been moved into positions $1'$ to $12'$ inclusive, the same circuit connections would have been established, except that the connections of field winding $f$ would have reversed, so that the direction of rotation of motor D would have been reversed.

I desire it to be understood that my invention is not limited to the particular arrangement shown and described, but aim in the appended claims to cover all modifications which do not depart from the spirit of my invention.

What I claim as new and desire to secure by Letters Patent of the United States, is,—

1. A system of motor control comprising a source of direct current supplying the motor of a fly-wheel motor generator set, a second motor supplied by said source and generator in series, and means operating on the field of the motor of said set to limit the amount of power demanded from said source.

2. A system of motor control comprising a source of direct current supplying the motor of a fly-wheel motor generator set, a second motor supplied by said source and generator in series, and a field winding on said first mentioned motor arranged to be excited so as to limit the amount of power demanded from said source.

3. A system of motor control comprising a source of direct current supplying the motor of a fly-wheel motor generator set, an auxiliary field winding on said motor excited by said generator, and a second motor supplied with current from said source and generator in series.

4. A system of motor control comprising a source of direct current supplying the motor of a fly-wheel motor generator set, a field winding on said motor in series with said generator, a second motor supplied by said source and generator in series, and an auxiliary field winding on said first mentioned motor arranged to be excited by said generator so as to limit the amount of power demanded from said source.

5. A system of motor control comprising a source of direct current supplying the motor of a fly-wheel motor generator set, an auxiliary field winding on said motor connected across the terminals of said generator, a second motor supplied by said source and generator in series, and means for varying the potential of said generator so as to oppose the potential of said source when said second motor is starting and to assist the potential of said source when said second motor is running at high speed, substantially as described.

6. A system of motor control comprising a source of direct current supplying the motor of a fly-wheel motor generator set, a field winding on said motor in series with said generator, an auxiliary field winding on said motor across the terminals of said generator, a second motor supplied by said source and generator in series, and means for varying the potential of said generator so as to oppose the potential of said source when said second motor is starting and to assist the potential of said source when said second motor is running at high speed, substantially as described.

7. In combination with a source of direct current supplying the motor of a fly-wheel motor generator set, an auxiliary field winding on said motor connected across the terminals of said generator, a second motor supplied by said source and generator in series, and a control switch adapted to connect the field winding of said generator to a source of excitation to vary the current supplied to the generator field winding and to reverse the field winding so that the potential of said generator opposes the potential of said source when said second motor is starting and assists the potential of said source when said second motor is running at high speed, said auxiliary field winding opposing the main field of the first mentioned motor when said second motor is starting and strengthening the main field of the first mentioned motor when said second motor is running at high speed.

8. In combination with a source of direct current supplying the motor of a fly-wheel motor generator set, a field winding on said motor in series with said generator, an auxiliary field winding on said motor connected across the terminals of said generator, a second motor supplied by said source and generator in series, and a control switch adapted to connect the field winding of said generator to a source of excitation, to vary the current supplied to the generator field winding and to reverse the connections of this field winding so that the potential of said generator opposes the potential of said source when said second motor is starting and assists the potential of said source when said second motor is running at high speed, said auxiliary field winding opposing said series field winding when said second motor is starting and assisting said series field winding when said motor is running at high speed.

9. A system of motor control comprising a source of direct current supplying the motor of a fly-wheel motor-generator set, a second motor supplied by said source and generator in series, means for varying the potential of said generator so as to oppose the potential of said source when said second motor is starting and to assist the potential of said source when said second motor is running at high speed, and means operating on the field of the motor of said set to limit the amount of power demanded from said source.

10. A system of motor control comprising a source of direct current supplying the motor of a fly-wheel motor-generator set, a second motor supplied by said source and generator in series, a control switch adapted to connect the field winding of said generator to a source of excitation to vary the current supplied to the generator field winding and to reverse the field winding so that the potential of said generator opposes the potential of said source when said second motor is starting and assists the potential of said source when said second motor is running at high speed, and means operating on the field of the motor of said set to limit the amount of power demanded from said source.

In witness whereof, I have hereunto set my hand this 27th day of May, 1908.

JOHN A. SEEDE.

Witnesses:
BENJAMIN B. HULL,
HELEN ORFORD.